June 12, 1962 W. BARDFELD 3,038,195
BRAKING CONTROL FOR DOOR CLOSERS
Filed Jan. 21, 1960 2 Sheets-Sheet 1

Inventor
W. Bardfeld
By Glascock Downing Seebold
Attys.

June 12, 1962 W. BARDFELD 3,038,195
BRAKING CONTROL FOR DOOR CLOSERS
Filed Jan. 21, 1960 2 Sheets-Sheet 2
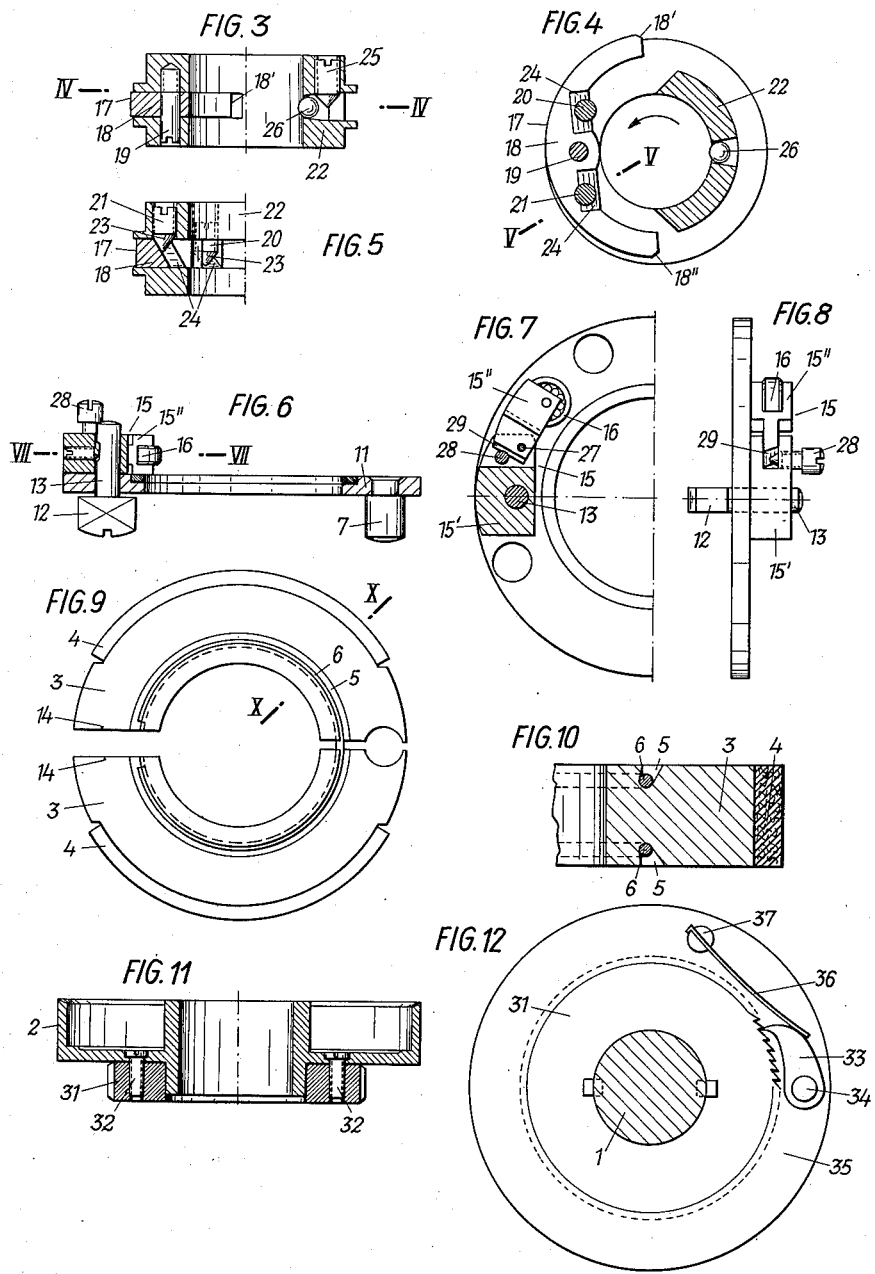
Inventor
W. Bardfeld
By Flesenk Downing Diebold
Attys.

United States Patent Office 3,038,195
Patented June 12, 1962

3,038,195
BRAKING CONTROL FOR DOOR CLOSERS
Wilhelm Bardfeld, Fillgradergasse 12, Vienna, Austria
Filed Jan. 21, 1960, Ser. No. 3,794
Claims priority, application Austria Jan. 29, 1959
9 Claims. (Cl. 16—49)

The invention relates to a braking control for door closers, making it possible, with simple means to effect the braking of the closing shaft needed for different doors, and therefore also of the door connected thereto, during the automatic closure of the door.

According to the invention, this object is realized by providing a brake drum connected to the closing shaft actuable in the direction of closing of the door, brake shoes, which can be applied against said brake drum by means of a toggle rotatably located in the casing, the positions of this toggle, corresponding to the appropriate braking moments, being adjustable through a feeler arm connected thereto, which can be applied to the control surface of a controller, which is rotated through the closing shaft. The toggle, causing the brake shoes to be pressed against the brake drum, may therefore, by appropriately designing the control surfaces of the controller, be actuated in such a way that, during the automatic closing movement, the brake shoes are pressed against the brake drum with such a force that the resulting friction causes the braking forces desirable at any one time of the closing to be exerted against the closing shaft connected to the brake drum. The controller, which is rotatable through the closing shaft and equipped with the control surface is connected immediately to the closing shaft pivotably arranged on an adjusting spindle, located parallel to the closing shaft, so that it can be set at various positions. In this case, one and the same control surface of the controller is sufficient to control the rotating movement of the toggle, actuating the brake shoes, in different ways, and to adjust the value of the braking moments applied during the closing movement. For the adjustment and fixing of the controller, which is rotatable about the adjusting spindle, set screws may be provided which screw at both sides of said adjusting spindle into a distance piece carrying this spindle, which distance piece may be rotated by the closing shaft. The ends of these set screws abut against adjusting surfaces of the controller, positioned so that their planes form an angle with the axes of these screws. Since the ends of the set screws may thus alter the controller in accordance with the desired braking, and since the controller is itself supported by the adjusting spindle, said controller can thus be fixed in that particular swivelling position, causing thereby an alteration of the position of its control surface cooperating with the feeler arm of the toggle, so that the toggle is now rotated in a different way corresponding to the adjustment of the control face.

In this arrangement, the controller carrying the control face can be in the form of a segment of an annulus partly surrounding the closing shaft. It is then mounted on the adjusting spindle which is itself mounted in the distance piece. The latter is directly connected with the closing shaft. This segment-like design of the controller provides also a simple means for producing the final closure of the door, that is the acceleration of the rotating movement of the same during the final stage of the closing movement, since one or the other end of the segment-shaped controller leaves the feeler arm of the toggle, which had been pressed against the control surface; this feeler arm thereby loses the support, enabling the toggle to be pressed against the brake shoes, so that they are no longer operative and the frictional lock is relieved. The connection between the controller and the closing shaft, merely through the distance piece, results here in a particularly simple design.

An advantageous further development comprises in the incorporation of an irrotatable coupling arrangement between the controller carrying the control face and the closing shaft, making possible various relative positions. This arrangement makes it possible to effect a temporal displacement of the occurrence of the braking moments during the closing, caused by the same relative adjustment between controller and distance piece, that is, to cause these moments to occur earlier or later during the closing, and to advance and retard the commencement of the final closure. Expediently, the controller may be connectable to the closing shaft by means of an annular distance piece surrounding the same, and making an irrotatable connection in various relative positions. This coupling may comprise, for example, a clamping component located within said distance piece and pressed against the closing shaft by a set screw in the distance piece.

The feeler arm connected to the toggle may consist of two mutually adjustable parts. This presents the advantage that the feeler arm can be adjusted to take up wear which may develop during operation in the brake shoes or in the drum, so that the contact pressure of the brake shoes against the brake drum may be kept constant without regard to the state of wear of the linings or of the drum. In order to produce the different relative angular positions of the two parts of the feeler arm, which are mutually connected by an articulated bolt, a set screw may be provided in one part, which rests against an oblique abutment surface of the other part and causes a mutual realignment and readjustment of both parts.

Finally, the brake drum may be connected to the closing shaft through a ratchet drive, so that the brake drum engages the closing shaft only when the latter revolves in the closing direction. This arrangement has the advantage that, during the opening of the door, that is when the closing shaft revolves in the opposite direction, the braking moments caused by the braking arrangement need not be overcome, since the ratchet drive is not engaging.

The invention will be further described, by way of example, with reference to the accompanying drawings, in which:

FIG. 3 is a detail, showing the sectional view of the distance piece with the controller and the adjusting spindle;

FIG. 4 is a sectionalized view along the line IV—IV of FIG. 3;

FIG. 5 is a cross-section along the line V—V of FIG. 4;

FIG. 6 is a side elevation of the toggle and the feeler arm connected thereto;

FIG. 7 is a top view of the parts of FIG. 6 taken along line VII—VII of FIG. 6;

FIG. 8 is a side elevation of the arrangement of FIG. 7;

FIG. 9 is a top view of the brake shoes;

FIG. 10 is a cross-section along the line X—X of FIG. 9 on an enlarged scale;

FIG. 11 is a sectional view of the brake drum and of the part of the ratchet drive connected thereto;

FIG. 12 shows a top view of the remaining parts of the ratchet drive.

Figure 1:
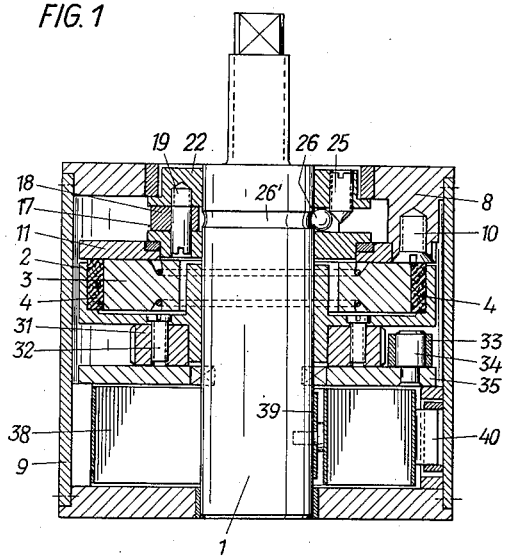
FIG. 1 is a sectional elevation of the door closer with a braking control according to the invention, omitting, for the sake of clarity several components, which are shown in detail in the other drawings.

In these drawings, the brake shoes 3 are pressed by means of the linings 4 against the inner wall of the brake-drum 2, connected to the closing shaft 1. The brake shoes 3 are urged from the walls of the drum 2 by circlips 6 in grooves 5. As is customary, the circlips are made of spring steel wire. In this position, that is if the circlips 6 are not resiliently expanded, the brake shoes and the brake linings 4 fitted thereon, and located within the brake drum 2, are not frictionally engaging the inner surface of the drum.

The brake shoes 3 are pivotably located about a pin 7, shown in FIG. 6, which is arranged on a carrier plate 11, fixed on the top cover plate 8 of the casing 9 by means of screws 10. The toggle 12 is located on a spindle 13 rotatably mounted within the same carrier plate 11. The ends 14 of both brake shoes 3, located diametrally relative to the pin 7 are, with unexpanded circlips 6 (FIG. 9) positioned at such a distance that the toggle 12 may be fitted into the space thereinbetween without necessitating an expansion of the brake shoes. The rotating movement of the toggle 12, corresponding to the required braking moment, may be adjusted by means of the feeler arm 15 issuing from the spindle 13, which feeler arm rests, by means of a roller 16 fitted on its free end against the control face 17 of the controller 18. This controller is rotatable by the closing shaft 1 and, in the embodiment illustrated in the drawings, also pivotably arranged about an adjusting spindle 19, which is positioned parallel to the closing shaft 1, so that it can be set at various positions. Conveniently a lever is clamped on the upper end of the closing shaft 1. The other end of the lever is connected to the door through a push rod. In order to adjust and set the controller 18, which is pivotable about the spindle 19, set screws 20, 21 (FIG. 4) are used, which are screwed on both sides of the adjusting spindle 19 into a distance piece 22, carrying said spindle, and capable of being rotated by the closing shaft 1. The ends 23 (FIG. 5) of these screws may be advanced against abutment surfaces 24 which are arranged on the controller 18, and the planes of which are set at an angle relative to the axes of said screws. The controller 18 carrying the control face or cam 17 forms a segment, embracing the closing shaft and is connected thereto directly through the distance piece 22, carrying the adjusting spindle 19. The two ends of the controller 18 are shown at 18', 18" in FIG. 4. The controller 18 can be irrotatably connected to the closing shaft in various relative positions by means of the distance piece 22 which forms a ring thereabout. For this purpose, there is provided in said distance piece 22 a spherical clamping element 26 which cooperates with a groove 26' machined into the closing shaft, and which is held in position by a clamping screw 25 screwed into the distance piece 22.

Figure 2:
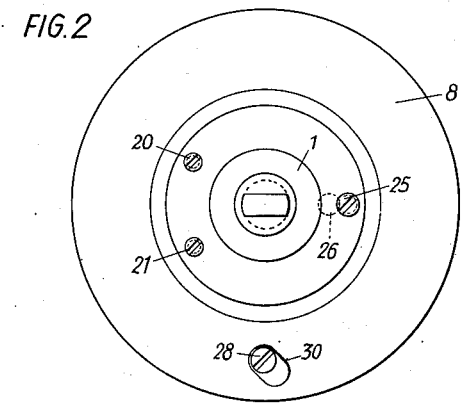
FIG. 2 is a top view of the arrangement of FIG. 1.

The feeler arm 15 of the toggle 12 consists of two parts 15', 15" which are connected by an articuated bolt 27 (FIG. 7) and can be set at various angular positions. In order to readjust these angular positions, one part 15' has an adjusting screw 28 which rests against an adjusting surface 29, arranged at an angle thereto on the other part 15", so as to produce mutual realignment and readjustment of both parts of the feeler arm. As may be seen more clearly from FIG. 2, both adjusting screws 20, 21, the clamping screw 25, and the adjusting screw 28 are accessible from the outside. With the screws 20, 21, 25, located in the distance piece 22, this is achieved in that the upper portion of the distance piece projects through the appropriately recessed top cover plate 8 of the casing 9. For the adjustment of the adjusting screw 28 from the outside, the top cover plate 8 has a recess 30.

In the embodiment shown, the brake drum 2 is not connected directly to the shaft 1, but by means of an intermediate ratchet drive, the ratchet wheel 31 of which is fitted by the screws 32 to the brake drum, which is rotatably located on the closing shaft 1, the ratchet 33 of the drive arrangement being rotatable about a pin 34, located on a plate 35, which is rigidly connected to the closing shaft, and following therefore its revolving movement. Due to the action of the spring 36 (FIG. 12) fitted to the plate 35, the ratchet is pressed against the toothing of the ratchet wheel, which is so designed that ratchet 33 drives the wheel 31 and therefore also the brake drum 2 only in one direction of rotation of the plate 35, which is rigidly fixed to the closing shaft 1, whilst in the other direction it slides over the teeth. The spring 36 is fixed in a holder 37 mounted on the plate 35.

The closing shaft is driven, in the embodiment of the drawings, by a spiral closing spring 38, operative in the direction of closing of the door. One end 39 of said spring is attached to the closing shaft, the other end 40 to the casing 9.

The operation of the arrangement is as follows:

Concerning first the adjustment of the components, the door is first opened, whilst simultaneously tensioning the closing spring 38, until it is in the position in which the so-called final closure would set in during the closing movement. It should be stressed that, with every opening movement the braking arrangement cannot become effective, since, even if there is a frictional engagement between the brake drum 2 and the brake shoes 3, the ratchet 33, following the revolving movement of the closing shaft, simply slides over the teeth of the ratchet wheel 31. In the desired final closure position, the ring-shaped distance piece 22, surrounding the closing shaft, is connected to the shaft by appropriately screwing the clamping screw 25 in or out, causing the ball-shaped clamping element 26 to be pressed against the shaft, so as to prevent further relative rotary movement; the roller 16 of the feeler arm is now located above one end 18' of the segment-shaped controller 18 in such a way that, when the door is further opened, this roller rests against the control face 17 of said controller 18. Then the controller 18 is adjusted on its adjusting spindle 19 in accordance with the braking force to be brought into play prior to the final closing movement. In cases, where a steady increase of the braking moment is to be produced from the moment of closing of the fully opened door, that is a more or less unbraked initial closing with gradual increase of the angular velocity, the controller 18 is (with a counterclockwise closing movement of the door as seen in plan view) adjusted, for example to the position of FIG. 4, but always in such a way that the control face 17 tends to press, during its rotary movement in the direction of closing of the door, the end of the feeler arm carrying the roller 16 towards the outside. This outward pressure on the feeler arm 15 and the consequent rotation of the toggle spindle 13 and of the toggle 12, causes the brake shoes 3 to be pressed increasingly against the brake drum 2, so that the original angular velocity of the closing shaft, and thereby also of the door, decreases gradually until the end 18' of the controller leaves the roller 16 and the feeler arm 15 is no longer supported against the control face 17. This relieves the torsional moment, causing the toggle 12 to operate the brake shoes, and the brake shoes 3 return suddenly under the action of the previously forcibly expanded circlips 6 into their original position, so that the frictional engagement between the brake drum and the brake shoes is broken. The force of the closing spring 38 can now be fully effective, and the door makes the final, fast, movement, necessary to engage the door lock. As can be seen from the foregoing, during this closing movement the brake drum 2 is irrotatably connected with the closing shaft 1 through the ratchet drive 31, 33.

By the opposite adjustment of the controller 18, that is by such an adjustment that (referring to FIG. 4) not the controller end 18', but the controller end 18" is further removed from the closing shaft 1, the braking of the door may be adjusted so that the maximum braking moment occurs immediately after the door is allowed to close, and the braking forces become steadily smaller until the final closing stage takes place. The braking may also be so adjusted that the braking moment is constant up to the time of final closure. If this is desired, the controller 18 is set so that the control face 17 is concentrically located relative to the closing shaft 1. The increase or decrease of the braking moments may be intensified or weakened by appropriately advancing more or less of the corresponding end 18' or 18" of the controller.

A strengthening or weakening of the braking moments themselves, irrespective of the temporal occurrence of the same, may be achieved by setting the appropriate angular position of the two parts 15', 15" of the feeler arm 15, by means of the adjusting screw 23. The more pronounced the angle between these two parts, the more will the braking shoes 3 be pressed by the toggle 12 against the inner wall of the brake drum 2 and vice versa. As already explained hereinbefore, the design of the feeler arm in two parts has also the purpose of adjusting the value of the braking moment with worn brake linings so that it is the same as with new linings.

What I claim is:

1. A door closer comprising a body member; a closing shaft which is rotatably mounted in the body member and is adapted for connection with a door; a brake drum attached to the closing shaft; a brake shoe arranged to co-operate with the brake drum; a toggle mounted in the body member for urging the brake shoe against the drum; a spindle generally parallel to the closing shaft; means linking this spindle with the closing shaft so that the spindle rotates about the axis of the closing shaft when the latter is rotated; a controller mounted on the spindle; means for tilting the controller about the axis of the spindle and setting it at different angular positions on the spindle; further means linking a cam face on the controller with the toggle so as to cause the latter to press the brake shoe against the brake drum when the controller is revolved with the closing shaft, these further means being arranged so that there is a gradual variation in the braking moment during rotation of the closing shaft; and resilient means urging the closing shaft in one direction of rotation.

2. A door closer as set forth in claim 1 comprising: a distance piece attached to the closing shaft to rotate with it; a pair of screws which are screwed into the distance piece and engage surfaces on the controller which are oblique to the axes of the screws so that on moving the screws in opposite directions along their axes the controller is caused to rock about the spindle.

3. A door closer as claimed in claim 2 in which the controller is in the form of a segment of an annulus partially embracing the closing shaft, and is connected with the latter by the distance piece.

4. A door closer as claimed in claim 3 comprising means which allow the controller to be caused to lead and lag the closing shaft in rotation.

5. A door closer as claimed in claim 4 comprising means for allowing the distance piece to be set on the closing shaft in various relative angular position.

6. A door closer as claimed in claim 5 comprising a clamping element in the distance piece; and a screw arranged in the latter for pressing the clamping element against the closing shaft.

7. A door closer as claimed in claim 6 in which the means linking the controller with the toggle comprise a feeler which engages a control face on the controller and is made in two parts which may be set in different relative angular positions.

8. A door closer as claimed in claim 7 comprising a screw screwed into one part of the feeler so as to engage a face on the other feeler part oblique to its axis so that axial movement of the screw varies the relative angular position of the two parts of the feeler.

9. A door closer as claimed in claim 8 comprising a ratchet device linking the closing shaft with the brake drum to cause rotation of the latter by the former in only one direction of rotation.

References Cited in the file of this patent
UNITED STATES PATENTS

| | | |
|---|---|---|
| 2,328,851 | Shackleton et al. | Sept. 7, 1943 |
| 2,355,276 | Danley | Aug. 8, 1944 |